(12) United States Patent  (10) Patent No.: US 7,491,061 B2
Mickey  (45) Date of Patent: Feb. 17, 2009

(54) EDUCATIONAL MATH TOY

(76) Inventor: D. Scott Mickey, 30 Deerfield Dr., Harrison City, PA (US) 15636

( * ) Notice: Subject to any disclaimer, the term of this patent is extended or adjusted under 35 U.S.C. 154(b) by 281 days.

(21) Appl. No.: 11/377,573

(22) Filed: Mar. 17, 2006

(65) Prior Publication Data
US 2006/0223036 A1 Oct. 5, 2006

Related U.S. Application Data

(60) Provisional application No. 60/666,522, filed on Mar. 31, 2005.

(51) Int. Cl.
G09B 19/02 (2006.01)
(52) U.S. Cl. ...................... 434/191; 434/198
(58) Field of Classification Search ............. 434/157, 434/171, 174, 188, 191, 198, 199, 206, 209, 434/156, 159, 167, 170, 172, 176, 178, 272; 273/294, 296, 302
See application file for complete search history.

(56) References Cited

U.S. PATENT DOCUMENTS

| 858,974 | A | | 7/1907 | Glasner et al. | |
|---|---|---|---|---|---|
| 1,024,195 | A | * | 4/1912 | Gothberg | 434/404 |
| 1,194,858 | A | * | 8/1916 | Matthews | 273/294 |
| 1,457,223 | A | * | 5/1923 | Gallup | 434/198 |
| 1,479,992 | A | * | 1/1924 | Kinney | 434/198 |
| 1,587,928 | A | * | 6/1926 | Thompson | 434/198 |
| 1,634,194 | A | * | 6/1927 | Jacobs | 434/198 |
| 2,336,742 | A | * | 12/1943 | Maguire | 434/198 |
| 2,533,443 | A | | 12/1950 | Farbman | |
| 2,643,467 | A | | 6/1953 | Goodwin | |
| 2,709,309 | A | * | 5/1955 | Stacey | 434/198 |
| 2,797,047 | A | | 6/1957 | Lehre | |
| 2,837,838 | A | * | 6/1958 | Lewis | 434/304 |
| 2,945,303 | A | | 7/1960 | Parkhurst | |
| 3,212,200 | A | | 10/1965 | Lundberg | |
| 3,345,759 | A | * | 10/1967 | Harris | 434/209 |
| 3,360,874 | A | * | 1/1968 | Myers | 434/198 |
| 3,579,874 | A | | 5/1971 | Smith | |
| 3,696,531 | A | * | 10/1972 | Stewart | 434/198 |
| 3,732,632 | A | | 5/1973 | Dyer | |
| 4,021,940 | A | | 5/1977 | Saint | |
| 4,043,057 | A | * | 8/1977 | Guswiler | 434/198 |
| 4,218,609 | A | | 8/1980 | Chin | |
| 4,568,086 | A | * | 2/1986 | Krogh | 273/141 R |
| 4,634,385 | A | | 1/1987 | Stemper | |

(Continued)

Primary Examiner—Kurt Fernstrom
(74) Attorney, Agent, or Firm—Richard C. Litman

(57) ABSTRACT

The educational math toy includes various embodiments, each having a triangular configuration. The toy is based upon the concept that two numerical factors will always provide a solution when manipulated by a mathematical operation, with the two factors being shown at two corners and the solution being shown at the third corner of the triangle. One series of embodiments includes variations on a mechanical device containing a central idler gear and a series of three outer gears arranged in a triangular array in a housing. The gears, or interchangeable display discs used therewith, rotate in registry, with each displaying one of a series of numbers through corresponding windows in one or both faces of the housing. The monolithic tiles are arranged in the same manner, but display only one fixed set of factors and one solution on each face. Braille may be used in lieu of numbers, if so desired.

15 Claims, 9 Drawing Sheets

U.S. PATENT DOCUMENTS

| | | | |
|---|---|---|---|
| 4,643,680 A * | 2/1987 | Hill | 434/170 |
| 5,108,291 A | 4/1992 | Kuo | |
| 5,346,399 A | 9/1994 | Sakow | |
| 5,769,639 A * | 6/1998 | Foster | 434/159 |
| 5,873,729 A | 2/1999 | Aghevli | |
| 6,869,286 B2 * | 3/2005 | Furry | 434/167 |

* cited by examiner

EDUCATIONAL MATH TOY

CROSS-REFERENCE TO RELATED APPLICATION

This application claims the benefit of U.S. Provisional Patent Application Ser. No. 60/666,522, filed Mar. 31, 2005.

BACKGROUND OF THE INVENTION

1. Field of the Invention

The present invention relates generally to educational devices, and more particularly to various embodiments of an educational math toy having triangular configurations with numerical factors at two of the corners and the answer to the problem at the third corner for teaching mathematics to children.

2. Description of the Related Art

The learning of basic arithmetical functions is primarily a matter of rote learning, i.e., memorization of the relative ranks and values of numbers, and their relative values when combined. Historically, basic arithmetic has often been taught in group academic settings by means of flash cards or similar devices. Regardless of the means used, the fact remains that the learning of basic arithmetical relationships is generally a tedious task, which is not enjoyed by most students.

As a result, various devices have been developed in attempts to facilitate the learning of basic arithmetic functions and/or to bypass the need to know such functions. Numerous electronic calculators and the like have been developed in response to the need for rapid and accurate numerical calculations, but it is still important that people know the basic numerical relationships. These relationships are often described in a triangular format, with two numerical factors at two of the three corners resulting in a numerical solution, which is placed in the third corner. As an example, two and three may be placed at two corners, with their multiplication resulting in six, which is placed at the third corner of the triangle. Such a triangular relationship is versatile, in that it can also be used to show that the division of the product (six) by either of the other two factors, results in the other factor. Much the same is true of addition and subtraction operations.

Yet, there has been little development of mathematical teaching toys and devices that possess such a triangular configuration to facilitate the learning of basic arithmetic relationships. Most, if not all, of the various devices of which the present inventor is aware have rectangular, or at least non-triangular, configurations, which do not suggest the three-way relationship between two numerical factors and a solution. Thus an educational math toy solving the aforementioned problems is desired.

SUMMARY OF THE INVENTION

The educational math toy comprises both monolithic and mechanically adjustable embodiments of a teaching toy or device having a triangular configuration. In the case of the mechanically adjustable embodiment, a series of three outer gears rotates about a central idler gear, with the central gear keeping the planetary gears in proper registry with one another. The outer gears may include numerical series upon their faces, with one of the numbers on each gear being visible through a window or opening in the housing of the device. Openable covers or the like may be applied to the windows, to conceal one of the three numbers as desired during use. Manipulation of the gears may be accomplished by means of an access port(s) in one or more sides of the housing. Rotation of the gears always results in two numerical factors being displayed in two of the windows, with the corresponding in registry rotation of the third gear providing a solution for the numerical operation applied to the first two factors. The device may be equipped with Braille indications, interchangeable numerical or Braille discs on the gears, and/or double sided displays using both sides of the gear faces, as desired.

Another embodiment of the educational math toy provides a series of monolithic, triangular tiles having numerical factors at two of the corners and a numerical solution at the third corner. A series of numerically different tiles may be provided in order to cover the desired numerical series. As in the case of the mechanical device, both sides may be used and/or Braille numbers may be applied to the device. The tiles are preferably of appropriate size to allow one of the numbers to be covered by a thumb or other digit of the student or instructor during use.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises an educational math toy for teaching basic arithmetic and mathematical functions and operations to young people. The present math toy includes two broad embodiments, with each of the broader embodiments including further minor embodiments. FIGS. 1 through 5 illustrate variations upon a mechanical math toy embodiment, while FIGS. 6A through 7B illustrate variations of a math toy comprising a solid, monolithic tile. The common inventive feature of the various embodiments is the triangular configuration, with two of the corners displaying two numerical factors and the third corner displaying a solution for the two factors, depending upon the mathematical operation performed.

Figure 1:
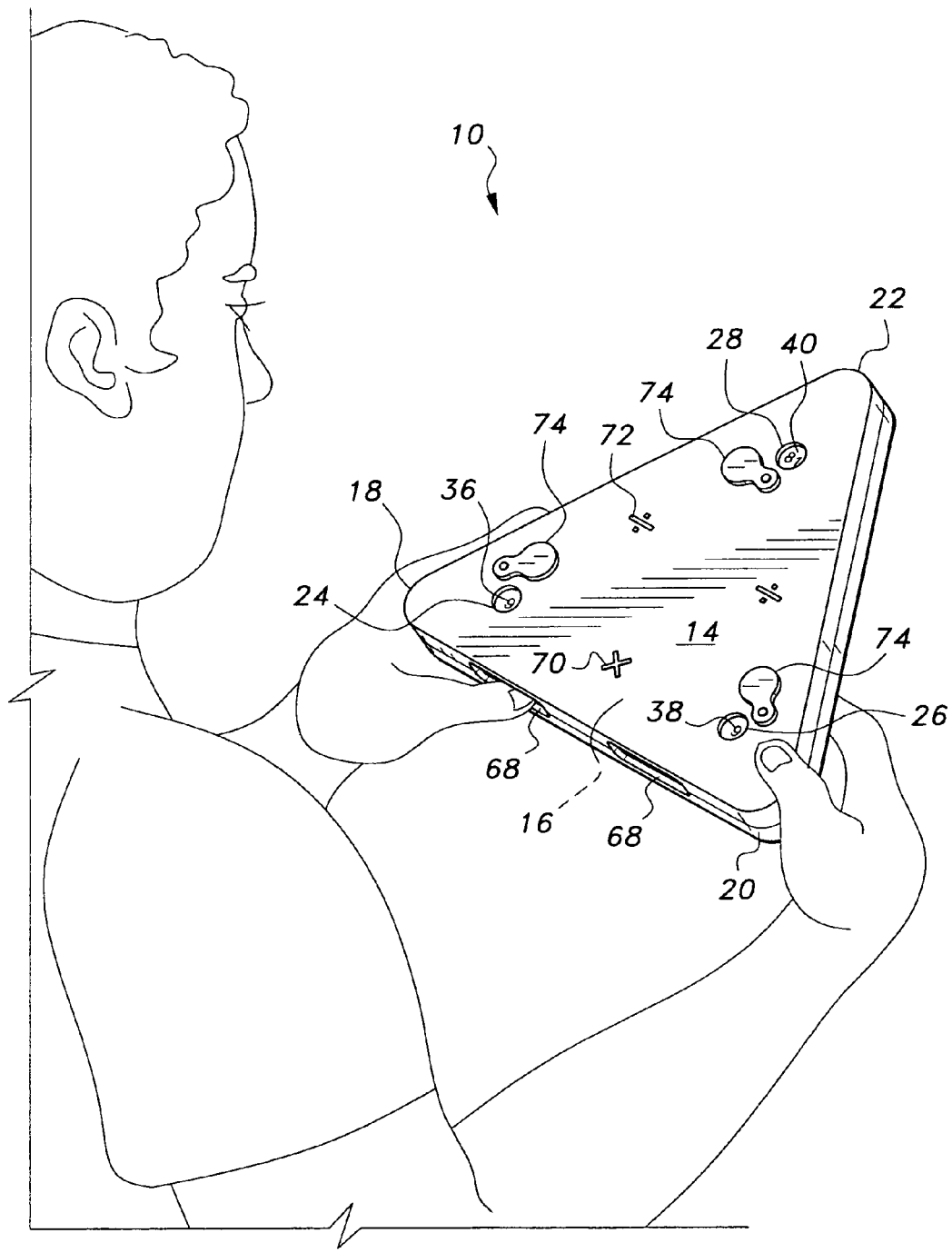
FIG. 1 is an environmental, perspective view of a student using a first embodiment of an educational math toy according to the present invention.
Figure 2:
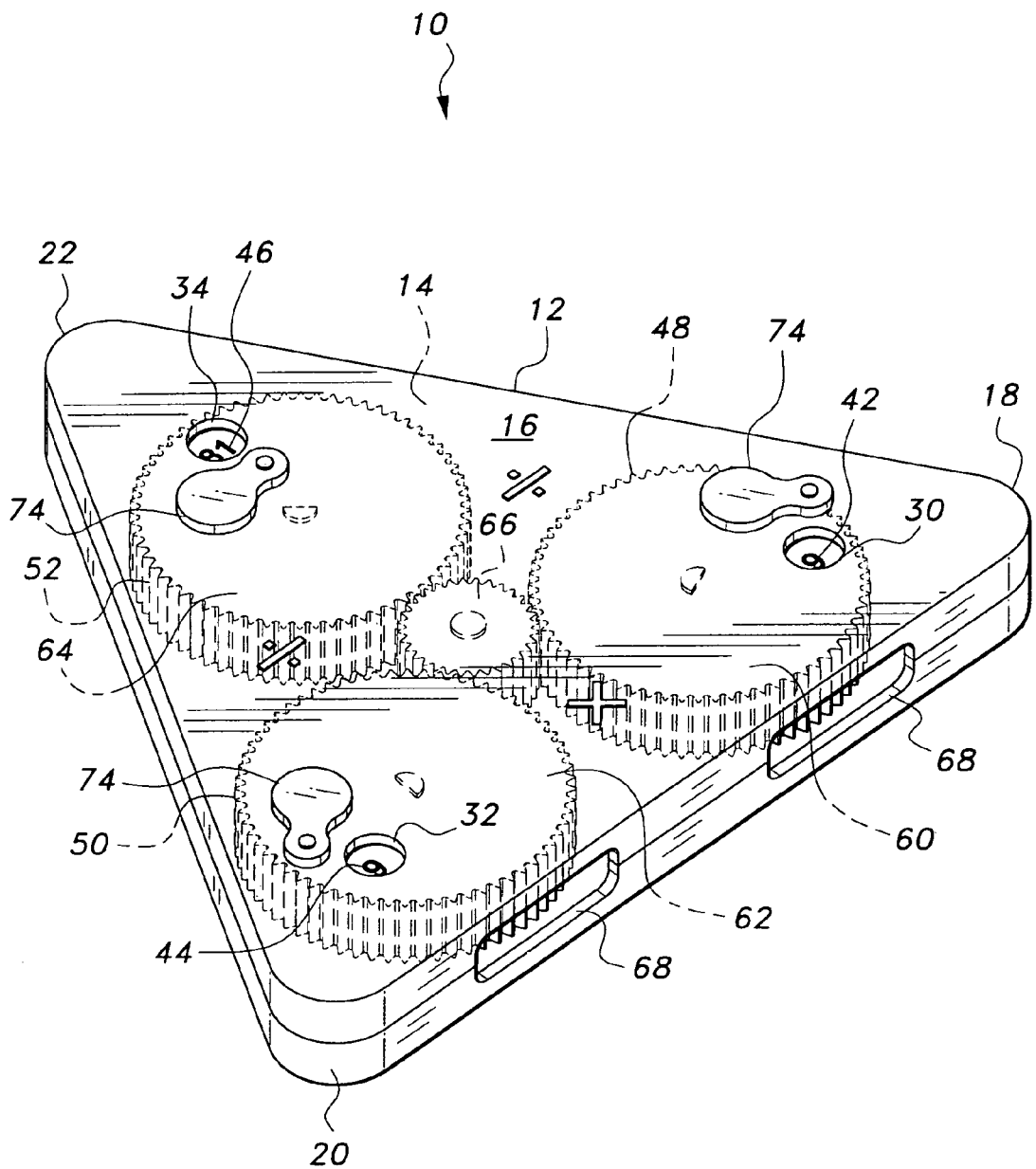
FIG. 2 is a rear perspective view of the embodiment of FIG. 1, illustrating its external features and showing the internal mechanism in broken lines.
Figure 3:
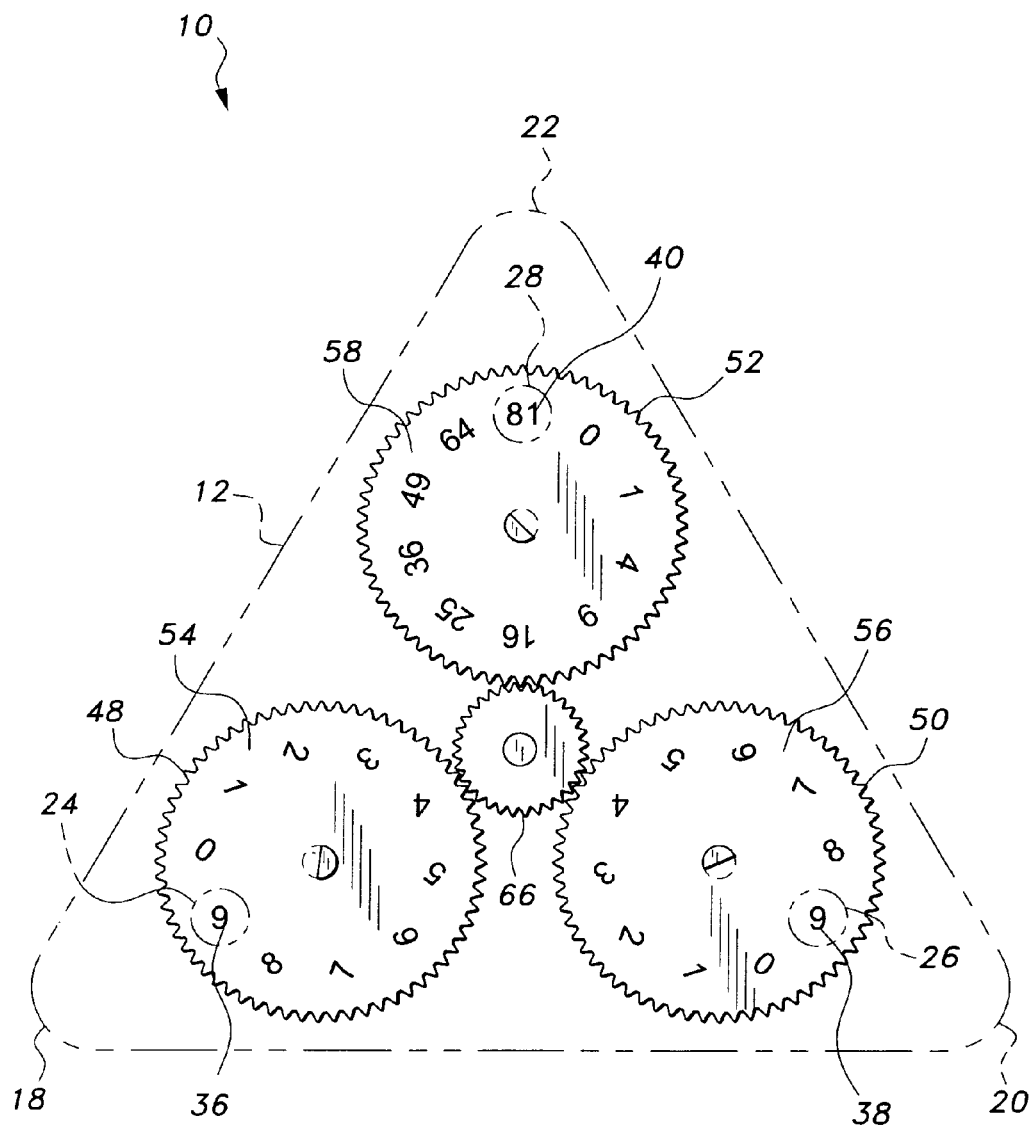
FIG. 3 is a top plan schematic view of the gearing of the embodiment of FIGS. 1 and 2.

FIG. 1 provides an illustration of a young student using a mechanical embodiment of the present math toy 10, with FIGS. 2 and 3 showing further details of the device 10. The math toy 10 includes a hollow triangular body, case, or housing 12 having a first face 14 and an opposite, parallel second face 16 (shown in the rear perspective view of FIG. 2). The triangular body or housing 12 includes first, second, and third corners, respectively 18, 20, and 22. At least the first face 14, and preferably the opposite second face 16 as shown in FIG. 2, includes a series of three viewing windows, openings, or passages therethrough, respectively 24, 26, and 28 in the first face 14, and 30, 32, and 34 in the second face 16. The three windows or openings in each face are disposed adjacent the respective corners 18 through 22.

A series of numerical factors are visible through the windows 24 through 28 (first face 14, FIG. 1) and/or windows 30 through 34 (second face 16, FIG. 2). First and second factors 36 and 38 are visible through the first and second windows 24 and 26 of the first face 14, with a numerical solution 40, achieved by an arithmetic operation or manipulation of the first two factors 36 and 38, being visible through the third window 28. Corresponding first and second factors 42 and 44 show in the first and second windows 30 and 32 of the second face 16, with a corresponding numerical solution 46 visible through the third window 34 of the second face 16. The various numerical factors and solutions of each gear face are configured to provide proper orientation when viewed through their respective windows 24 through 28 with the device 10 held as shown in FIG. 1, regardless of the rotation of the gears and the specific factors displayed.

The first two numbers or factors 36, 38 and numerical solution 40 (first face 14) and factors 42, 44 and solution 46 (second face 16) are respectively disposed upon the faces of first through third rotating gears 48 through 52, shown in FIGS. 2 and 3, disposed within or adjacent the corresponding corners 18 through 22 of the toy 10. Each of the gears 48 through 52 includes a first face, respectively 54 through 58 (FIG. 3), and an opposite second face, respectively 60 through 64 (FIG. 2). The first numerical series 36 through 40 is disposed upon the first faces 54 through 58 of the gears, with the second numerical series 42 through 46 being disposed upon the second gear faces 60 through 64.

It will be seen that each of the gear faces 54 through 64 contains a large number of different numerical factors or solutions. As the gears 48 through 52 are rotated, different numbers will appear in the windows 24 through 28 of the first face 14 of the device, with still other numbers appearing in the second face windows 30 through 34. The gears 48 through 52 do not mesh directly with one another, but are held in rotary registry with one another by a single central idler gear 66. Each of the outer gears 48 through 52 contains the same number of teeth, thus assuring a precise 1:1 rotary ratio between the planetary gears. The diameter and number of teeth or pitch of the central idler gear 66 is irrelevant, so long as the outer gears 48 through 52 have identical tooth counts. The idler gear 66 may be larger or smaller in diameter, or the same diameter, as the outer gears, as desired. A smaller idler gear 66, as shown, provides greater room for larger diameter outer gears, which may contain correspondingly greater numbers of numerical factors and solutions thereon. Further, although spur gears are shown in the drawings, friction or other types of gears may be used in lieu of spur gears.

One or more gear manipulation access passages 68 may be placed along the edge of the case or body 12 of the device, enabling a user of the device to access one or more outer gears within the case. One (or more) of the outer gears 48 through 52 may be rotated through the access passage(s) 68, generally as shown in FIG. 1 of the drawings. When any one of the outer gears is rotated, the corresponding outer gears rotate in the same direction in unison by means of the idler gear 66. The numerical factors displayed within the faces 14 and 16 of the device, i.e., through the windows in those faces, also change correspondingly. These factors are arranged upon the gear faces to form a correct mathematical relationship at all times. Alternatively, the shaft for the idler gear 66 may extend through the case 12 and be equipped with a knob, so that rotation of the idler gear shaft simultaneously rotates the three outer gears 48 through 52.

In the example of FIGS. 1 and 3, the number nine has been dialed in as the first factor 36 visible through the first window 24. Rotation of the first gear 48 results in corresponding rotation of the second gear 50, with a predetermined second factor 38 (e.g., the number nine) rotating into position on the second gear 50 where it is visible in the second window 26. Simultaneously, the third gear 52, containing a series of mathematical solutions for the two factors 36 and 38, is rotated to display a numerical solution 40 (e.g., the number eighty one) through the third or solution window 28, as shown in FIGS. 1 and 3. The mathematical operation may be indicated by a conventional symbol, e.g., the multiplication symbol 70 shown in FIG. 1, on the exterior of the case or body 12 of the device. Alternatively, the "solution" number or factor 40 visible through the third window 28 may be mathematically manipulated to arrive at the first or second factor number 36 or 38. This process may be indicated by appropriate mathematical symbols, e.g., the division symbols 72, placed on the body 12 between the appropriate viewing windows, as shown in FIG. 1.

Thus, the two numerical factors 36 and 38 of the first and second windows 24 and 26 may be multiplied together to arrive at the solution 40 in the third window 28, or the solution 40 in the third window 28 may be divided by one of the first two factors 24 or 26 to arrive at the counterpart factor. While multiplication and division operations are indicated in FIG. 1, it should be understood that these operations are exemplary, and other operations (e.g., addition and subtraction) may be provided as desired, with corresponding adjustment of the numerical factors provided. Additional challenge may be provided by means of selectively openable and closable window covers 74 (e.g., pivotally attached, hinged to the body or case, flexible flaps, etc.) disposed at each of the factor or solution viewing windows 24 through 28. A user of the device may cover any one of the factor or solution windows by means of the window covers, with the remaining two visible numbers being used as factors to arrive at the concealed solution. The student's response is then checked by moving the closed cover to display the previously concealed number.

Figure 4:
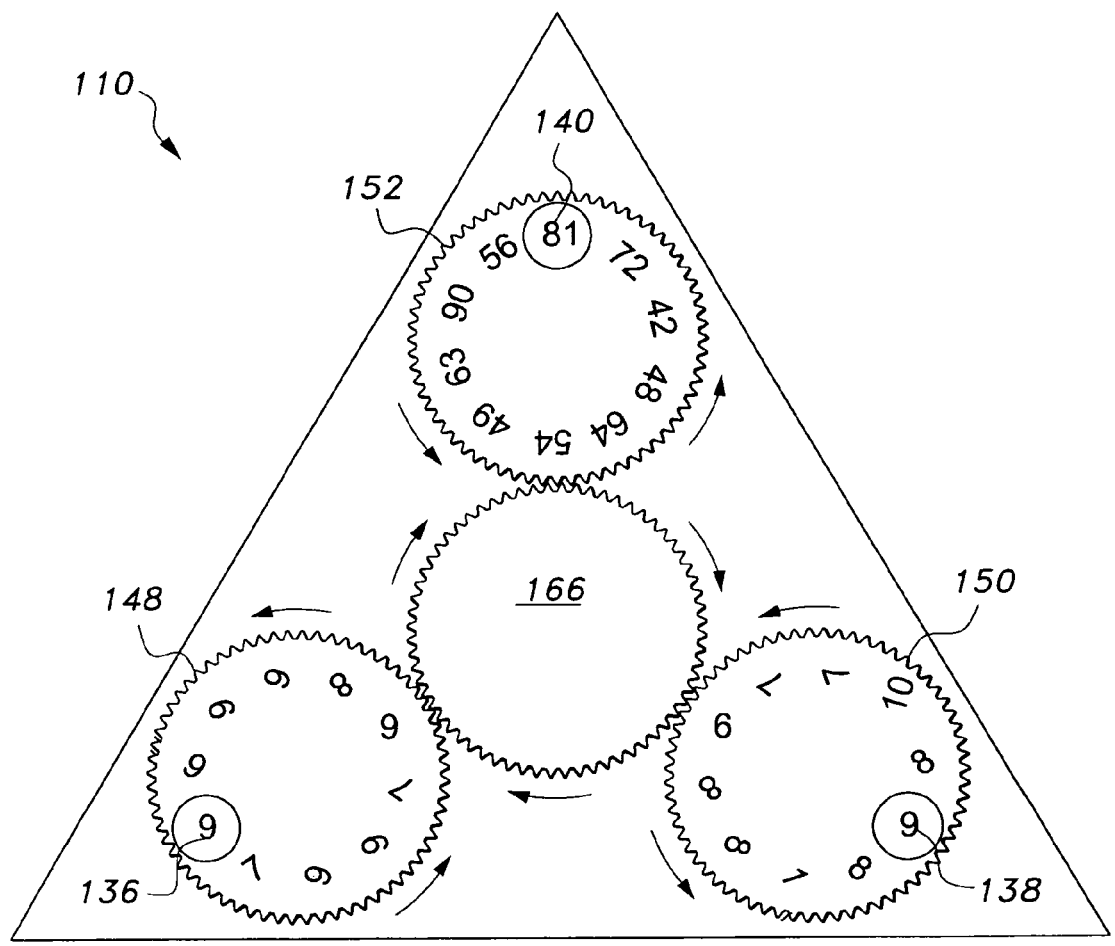
FIG. 4 is a top plan schematic view of an alternative embodiment in which the numbers on the gear faces are in other than consecutive numerical order.

The educational math toy embodiment 10 of FIGS. 1 through 3 has all of the numerical factors, and the corresponding numerical solutions, disposed in sequential order within the first and second faces 14 and 16 of the device on the corresponding faces of the gears contained within the body 12 of the device. However, it will be seen that such sequential ordering of the numbers is not required. The embodiment 110 of FIG. 4 illustrates a variation in which the various factor and solution numbers, e.g., factors and solution 136, 138, and 140, are not in sequential order. This adds some further challenge to the process of finding solutions to the numerical factors, as the sequential order cannot be memorized.

It will be noted, however, that the same 1:1 ratio of each of the outer gears 148, 150, and 152 is maintained due to the meshing of those gears with the single central idler gear 166 of the arrangement, just as in the embodiment of FIGS. 1 through 3. Also, the idler gear 166 is of the same diameter as the three outer gears 148 through 152 in the embodiment 110 of FIG. 4. Again, the relative diameter of the idler gear is not critical in any of the embodiments, and may be any practicable diameter as desired, so long as the outer gears maintain their 1:1 gear ratios with one another. Also, while numerical factors and solutions are shown on only one gear face on each of the gears in the embodiment 110 of FIG. 4, it will be understood that other numerical factors and solutions may be placed upon their opposite faces, with corresponding viewing windows placed in the opposite side or face of the triangular case or body 112, if so desired.

Figure 5:
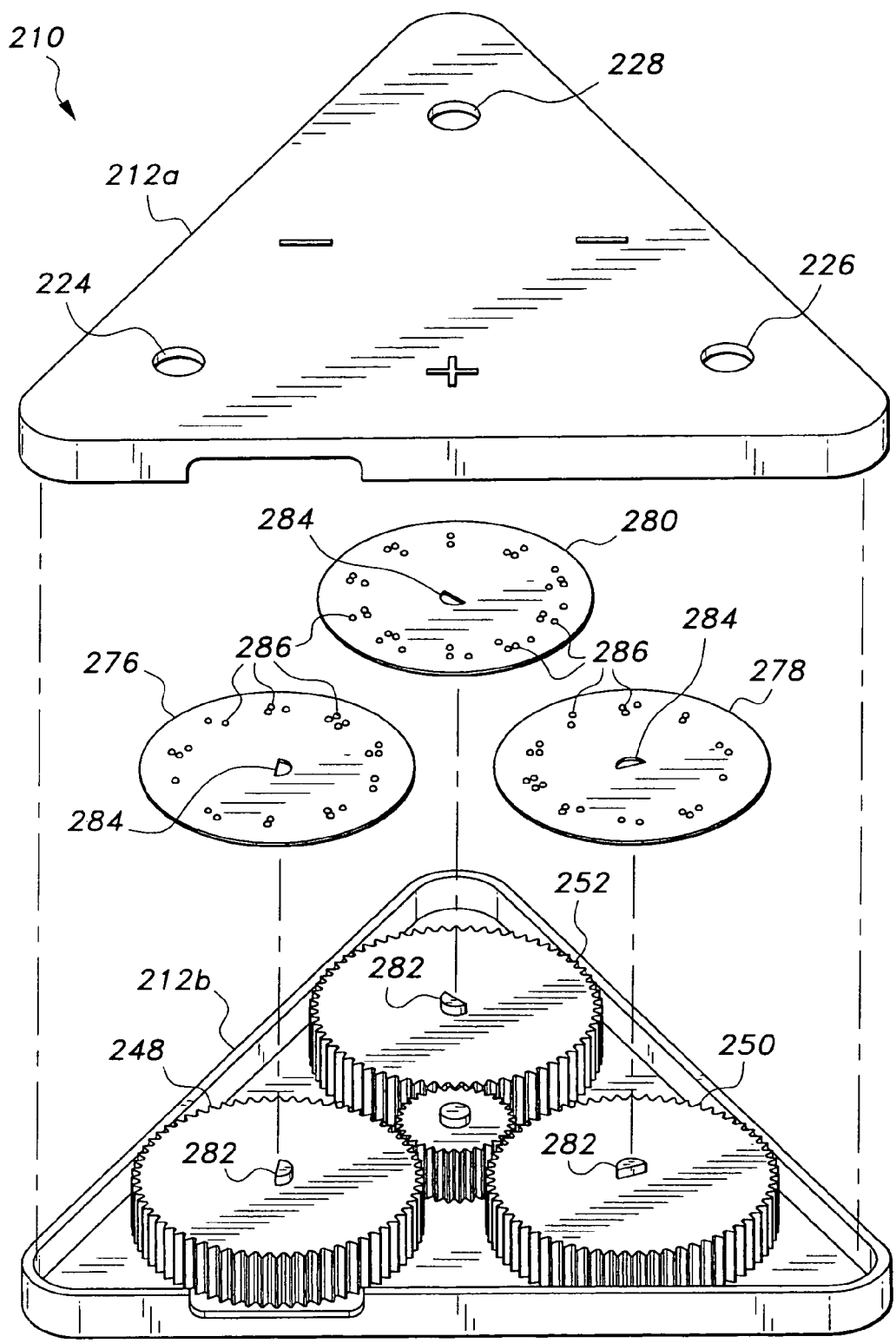
FIG. 5 is an exploded perspective view of another embodiment of the mechanical device, providing for interchangeable Braille or numerical faces for the gears.

FIG. 5 illustrates an alternative embodiment in which the numerical factors may be interchangeably placed within the body or case 212 of the device 210. The educational math toy embodiment 210 includes a hollow body or case formed of two separable components 212a and 212b, to provide access to the interior of the device. The interior contains three outer gears 248, 250, and 252, each rotated in unison by a central idler gear 266. However, rather than having numerical factors and solutions provided directly upon the faces of the gears, the embodiment 210 of FIG. 5 includes a series of three interchangeable and replaceable numerical factor and solution discs, respectively 276, 278, and 280.

Each of the discs 276 through 280 is secured in registry upon its respective gear by mating asymmetrical fittings, e.g., the semicircular pegs 282 extending from the gears and corresponding semicircular slots or passages 284 formed through the interchangeable discs 276 through 280. The use of non-circular pegs and slots assures that the discs will always turn in unison with their corresponding gears, with the asymmetrical shapes of the slots and pegs assuring that the discs must always be installed in their proper orientation to the gears. Also, while the interchangeable discs 276 through 280 are shown for only one side or face of the gears 248 through 252, it will be seen that the assembly may be inverted to access the opposite gear faces for the removable and interchangeable installation of the discs 276 through 280, or other discs, thereon. Moreover, the discs 276 through 280 may be provided with mathematical factors on both of their sides or surfaces, if so desired.

It will be recognized that numerical representations other than printed Arabic numerals may be used in the present invention, if so desired. FIG. 5 also discloses the use of Braille symbols 286 on the faces of the interchangeable discs 276 through 280. The Braille symbols 286 correspond with one another to form the proper mathematical relationships between the specific symbols displayed through the windows 224 through 228 of the first body or case component 212a, and are configured to provide the proper orientation when tactually sensed by the user of the device 210. It will also be understood that such Braille symbols may be formed directly upon either or both of the two faces of the gears in any of the other embodiments of the present invention as shown in FIGS. 1 through 3, if so desired, and/or conventional Arabic numerals may be provided on the discs 276 through 280 of the embodiment 210 of FIG. 5 in lieu of the Braille symbols shown, if so desired.

It will be understood that, in the embodiments of FIGS. 1-5, when one of the outer gears is rotated, the other two gears simultaneously rotate through the same angle, so that when one factor is changed, the other factor and the corresponding result also change. It will be obvious that the same numeral may appear at more than one radial position on the same gear face, e.g., to teach multiplication tables.

Figure 6A:
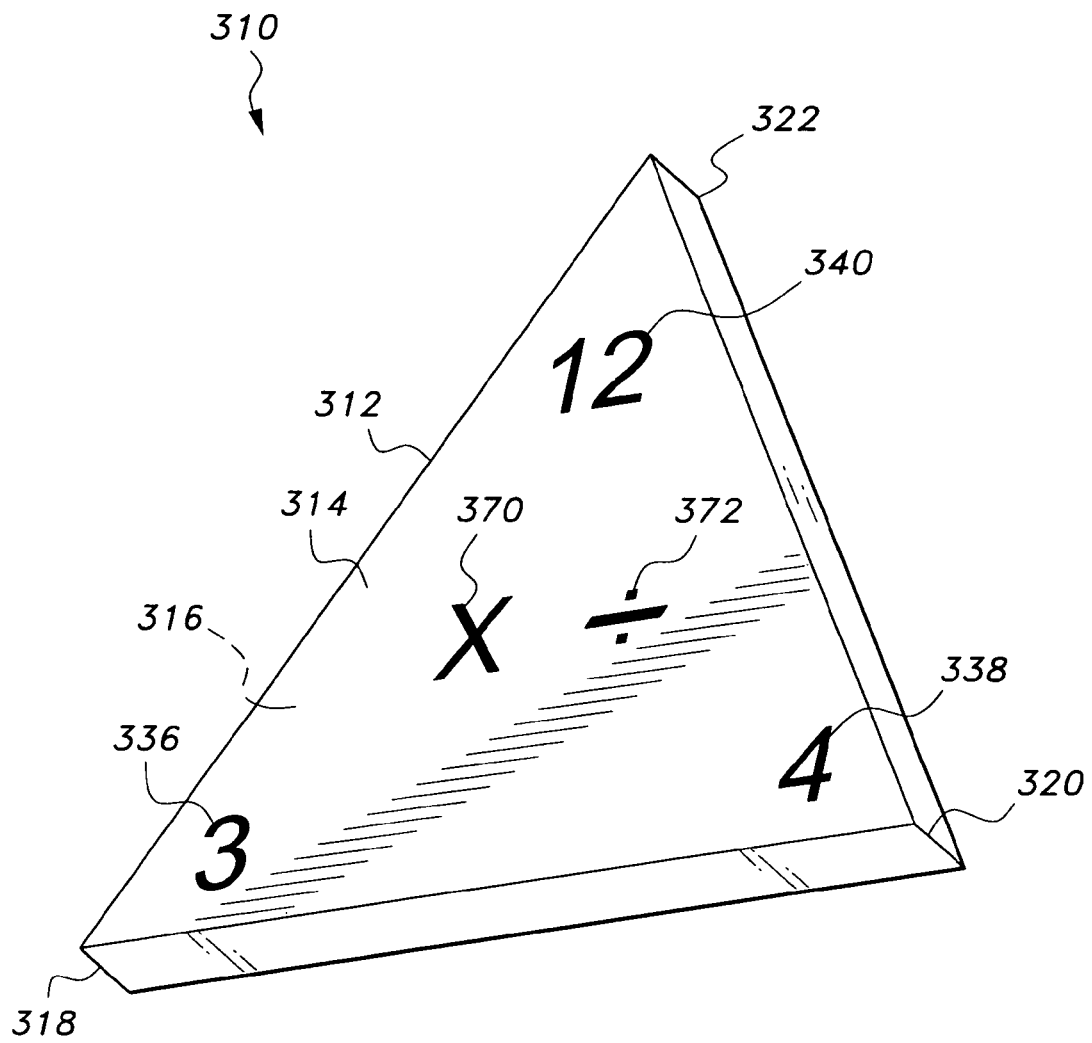
FIG. 6A is a perspective view of a first face of an exemplary numbered tile of the present invention.
Figure 6B:
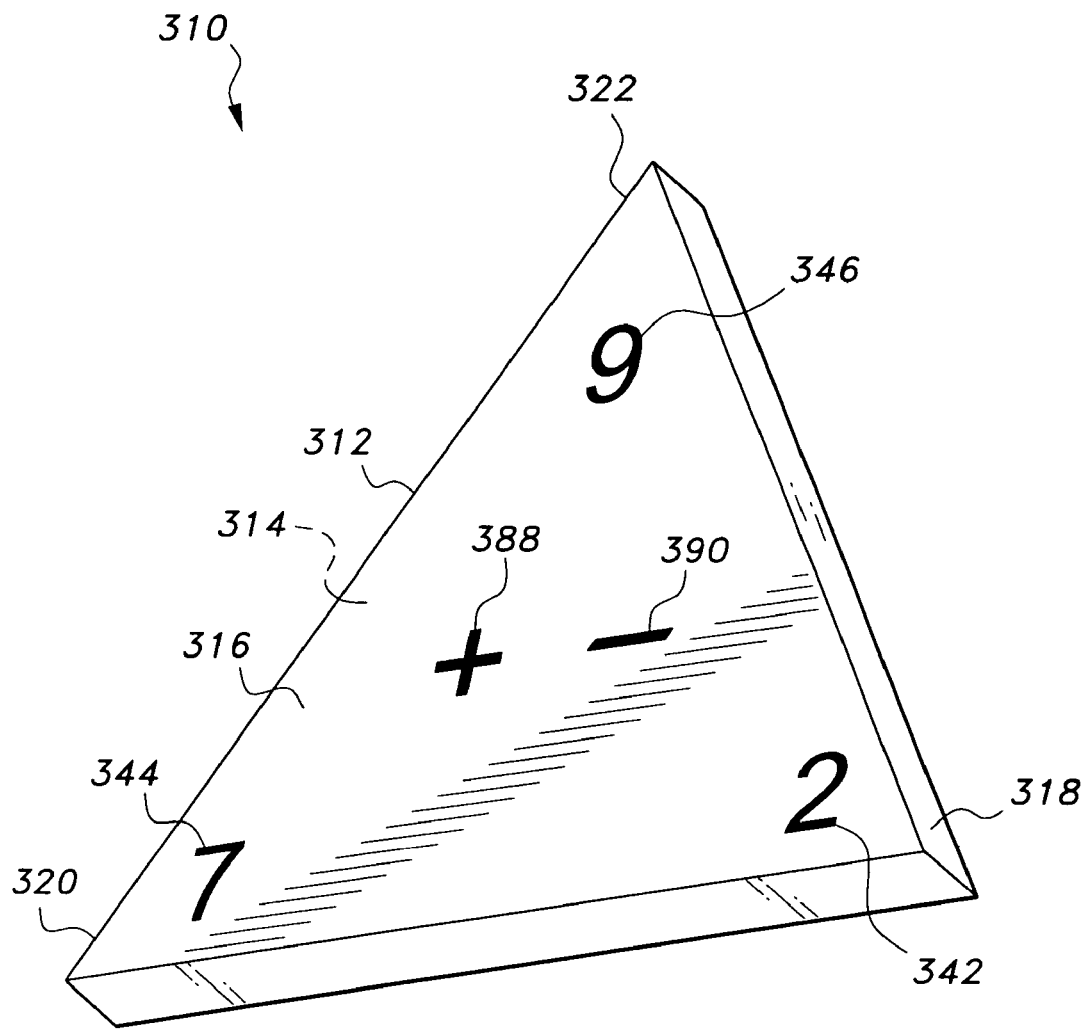
FIG. 6B is a perspective view of the opposite face of the tile of FIG. 6A.

FIGS. 6A and 6B illustrate the opposite sides of still another embodiment of the present educational math toy, designated as embodiment 310. The math toy 310 comprises a solid, monolithic tile having a flat triangular body 312 with a first face 314 (FIG. 6A) and an opposite, parallel second face 316 (FIG. 6B). The triangular body includes first through third corners, respectively 318 through 322, with the first two corners respectively having first and second numerical factors 336 and 338 placed adjacent thereto and within the first face 314, and the third corner having a numerical solution 340 for the first two factors placed adjacent thereto within the first face of the toy 310. The corners 318 through 322 may be relatively acute, as shown, or more rounded, as in the embodiments of FIGS. 1 through 5.

Mathematical operative symbols, e.g., a multiplication sign 370 and a division symbol 372, may also be placed upon the first face 314 of the device to indicate the desired mathematical operation to be performed using the first two factors 336 and 338 to arrive at the solution 340. The operation symbols 370 and 372 may be placed generally on the first face 314, or arranged between each two of the factors and solution to more specifically indicate the type of operation to be performed using those two numbers, as shown in the embodiment 10 of FIGS. 1 and 2. In the example shown in FIG. 6A, multiplication of the two numerical factors 336 and 338 results in the solution 340 within the third corner 322, while division of the multiplication solution 340 by either of the two factors results in the counterpart factor as a solution.

FIG. 6B provides an illustration of the opposite second face 316 of the solid tile educational math toy embodiment 310. In FIG. 6B, first and second additive factors 342 and 344 are placed within the second surface 316 of the device respectively adjacent the first and second corners 318 and 320, with the solution 346 placed adjacent the third corner 322. The addition of the first two factors 342 and 344 results in the numerical solution 346, as indicated by the addition operation sign 388 disposed upon the second face 316 of the device. Use of the subtraction operation symbol 390 applied to either of the first two factors 342, or 344 on the third corner number 346, results in the counterpart factor as the solution. It will be seen that the various factors and solution, and their operation signs, may be varied as desired to provide a series of arithmetic problems and solutions on either or both sides or surfaces of the triangular toy 310.

Figure 7A:
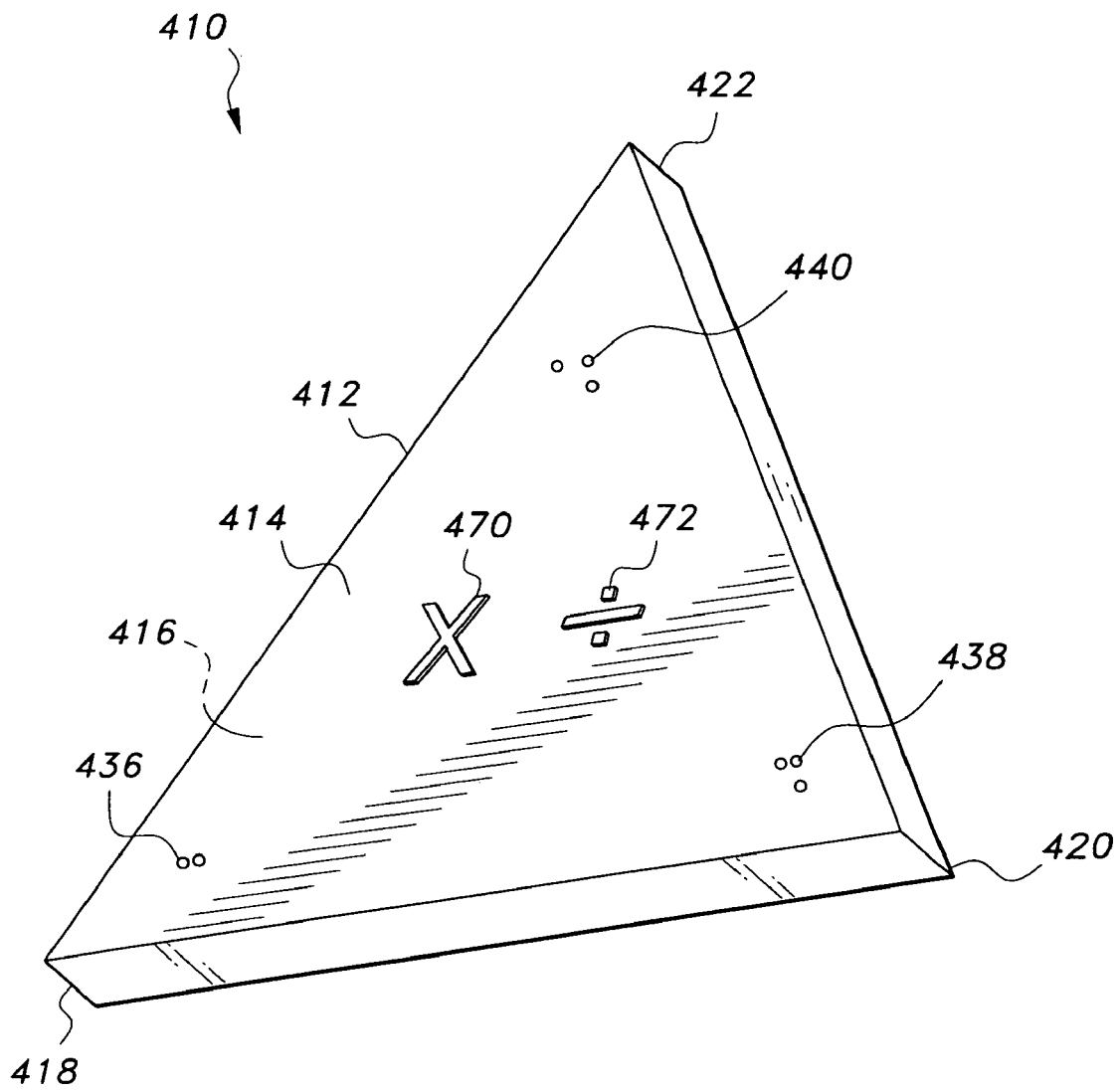
FIG. 7A is a perspective view of a first tile face having the same numerical values as the tile face of FIG. 6A, but using Braille indicators.
Figure 7B:
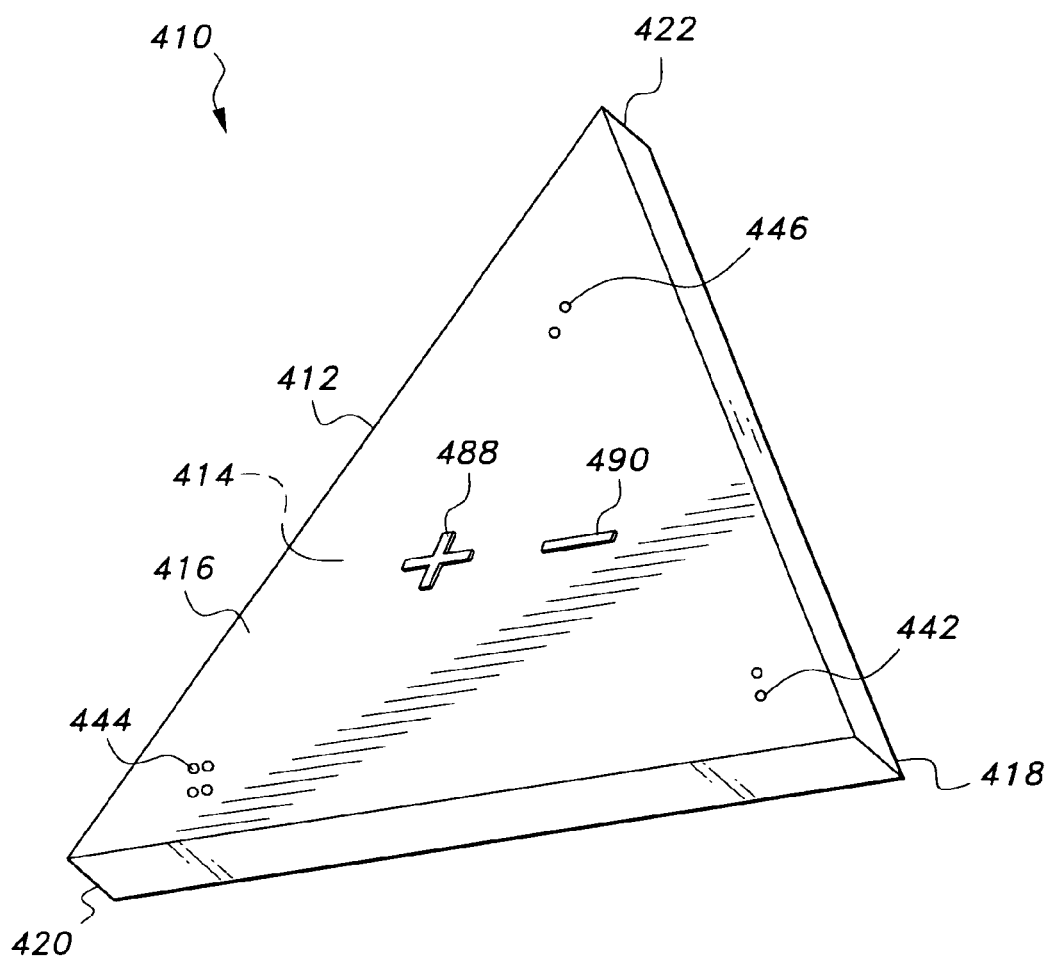
FIG. 7B is a perspective view of the opposite tile face of the tile of FIG. 7A, showing the same numerical relationships as the tile face of FIG. 6B, but in Braille.

FIGS. 7A and 7B provide front and rear perspective views of an alternative embodiment of the educational math toy of FIGS. 6A and 6B, with the math toy 410 of FIGS. 7A and 7B having Braille symbols thereon rather than Arabic numerals. The educational math toy 410 is configured generally like the math toy 310 of FIGS. 6A and 6B, comprising a flat, solid, monolithic, triangular body 412 having opposed, parallel first and second faces 41.4 and 416 and first through third corners 418 through 422.

However, rather than using printed Arabic numerals as the numerical factors and solution, the embodiment 410 utilizes Braille symbols for the two numerical factors 436 and 438 and the numerical solution 440 on the first face 414 (FIG. 7A), as well as for the two factors 442, 444 and solution 446 on the second face (FIG. 7B). The Braille symbols shown in FIGS. 7A and 7B have the same numerical values as their corresponding Arabic numerals of the device shown in FIGS. 6A and 6B, with corresponding multiplication and division operation symbols 470 and 472 on the first face 414 (FIG. 7A) and corresponding addition and subtraction symbols 488 and 490 on the second face 416 (FIG. 7B). As in the case of the triangular math toy 310 of FIGS. 6A and 6B, any numerical symbols may be used as desired, so long as the proper mathematical relationships and solutions are maintained.

In conclusion, the educational math toy in its various embodiments serves to greatly facilitate the learning of various simple mathematical relationships, e.g., single digit addition, subtraction, and multiplication, and even division by single digits. Any or all of the embodiments may incorporate numerical and operational symbols other than Arabic numerals, e.g., Braille or other tactile or visual numerical symbols, as desired. While the series of embodiments incorporating gearing to change the numerical factors and corresponding solution may be entertaining to somewhat more advanced students, the embodiments comprising solid blocks or tiles having numerical relationships on one or both of their faces will be of great value and entertainment to very young people. Regardless of the specific embodiment or age group, the educational math toy in its various embodiments greatly facilitates the teaching of a solid foundation of basic arithmetic principles, based upon the principle of two factors producing a third number as a solution when the first two factors are combined.

It is to be understood that the present invention is not limited to the embodiments described above, but encompasses any and all embodiments within the scope of the following claims.

I claim:

1. An educational math toy, comprising:
   a flat, triangular body having a first face, a second face opposite the first face and parallel thereto, and first, second, and third corners, wherein said triangular body comprises:
   a hollow case;
   a central near disposed within said case;
   first, second, and third outer gears disposed within said case, respectively adjacent the first, second, and third corner thereof, the outer gears meshing with the central gear, each of the outer gears having a first gear face and a second near face opposite the first gear face;
   a plurality of first numerical factors disposed upon the first gear face of the first of the outer gears;
   a plurality of second numerical factors disposed upon the first gear face of the second of the outer gears;
   a plurality of numerical solutions disposed upon the first gear face of the third of the outer gears; and
   first, second, and third viewing windows disposed in the first face of said case, respectively adjacent each corner, selectively exposing one of the numerical factors and one of the numerical solutions therethrough;
   a first numerical factor displayed on the first face adjacent the first corner;
   a second numerical factor displayed on the first face adjacent the second corner; and
   an arithmetical solution for a combination of said first numerical factor and said second numerical factor resulting from an arithmetical operation displayed on the first face adjacent the third corner.

2. The educational math toy according to claim 1, wherein said case has at least one gear manipulation access passage defined therein.

3. The educational math toy according to claim 1, further including a selectively opening and closing window cover disposed at each of said viewing windows.

4. The educational math toy according to claim 1, further including:
   a plurality of first numerical factors disposed upon the second gear face of the first of said outer gears;
   a plurality of second numerical factors disposed upon the second gear face of the second of said outer gears;
   a plurality of numerical solutions disposed upon the second gear face of the third of said outer gears; and
   first, second, and third viewing windows disposed in the second face of said case, respectively adjacent each corner, selectively exposing one of the second gear face numerical factors and one of the second gear face numerical solutions therethrough.

5. The educational math toy according to claim 1, further including first and second numerical factor and numerical solution display discs interchangeably disposed respectively upon at least the first gear face of said first, second, and third outer gears.

6. The educational math toy according to claim 1, wherein each of said numerical factors and said numerical solutions are in Braille.

7. The educational math toy according to claim 1, wherein said triangular body comprises a solid, monolithic tile.

8. The educational math toy according to claim 7, further including:
   a first numerical factor disposed within the second face adjacent the first corner;
   a second numerical factor disposed within the second face adjacent the second corner; and
   an arithmetical solution for the combination of the first numerical factor and the second numerical factor disposed within the second face adjacent the third corner.

9. The educational math toy according to claim 7, wherein each of said numerical factors and said numerical solutions are in Braille.

10. An educational math toy, comprising:
    a hollow, triangular case having a first face, a second face opposite the first face and parallel thereto, and first, second, and third corners;
    a central idler gear disposed within the case;
    first, second, and third outer gears disposed within the case adjacent the first, second, and third corners, respectively, the outer gears meshing with the central idler gear, each of the outer gears having a first gear face and a second gear face opposite the first gear face;
    a plurality of first numerical factor indicia displayed on the first gear face of the first outer gear;
    a plurality of second numerical factor indicia displayed on the first gear face of the second outer gear;
    a plurality of numerical solution indicia displayed on the first gear face of the third outer gear; and
    first, second, and third viewing windows disposed in the first face of the case, respectively adjacent each corner, selectively exposing one of the numerical factors and one of the numerical solutions therethrough.

11. The educational math toy according to claim 10, wherein said case has at least one gear manipulation access passage defined therein.

12. The educational math toy according to claim 10, further including a selectively opening and closing window cover disposed at each of said viewing windows.

13. The educational math toy according to claim 10, further including:
    a plurality of first numerical factors disposed upon the second gear face of the first outer gear;
    a plurality of second numerical factors disposed upon the second gear face of the second outer gear;
    a plurality of numerical solutions disposed upon the second gear face of the third outer gear; and first, second, and third viewing windows disposed in the second face of said case, respectively adjacent each corner, selectively exposing one of the second gear face numerical factors and one of the second gear face numerical solutions therethrough.

14. The educational math toy according to claim 10, further including first and second numerical factor and numerical solution display discs interchangeably disposed respectively upon at least the first gear face of the first, second, and third outer gears.

15. The educational math toy according to claim 10, wherein each of said numerical factors and said numerical solutions are in Braille.

* * * * *